(12) United States Patent　　(10) Patent No.: US 9,357,123 B1
Schiller　　(45) Date of Patent: May 31, 2016

(54) IMAGE DEFOCUS BLUR ESTIMATION

(71) Applicant: Adobe Systems Incorporated, San Jose, CA (US)

(72) Inventor: Stephen N. Schiller, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/581,688

(22) Filed: Dec. 23, 2014

(51) Int. Cl.
*G06K 9/40* (2006.01)
*H04N 5/232* (2006.01)
*G02B 27/64* (2006.01)

(52) U.S. Cl.
CPC .......... *H04N 5/23212* (2013.01); *G02B 27/646* (2013.01)

(58) Field of Classification Search
USPC ......... 382/255, 254, 260, 264, 180, 228, 159, 382/275; 340/907, 908; 345/473, 102.1, 345/581; 348/222.1, 340, 241, 240.99, 348/E5.108, E5.077; 375/E7.226
See application file for complete search history.

(56) References Cited

U.S. PATENT DOCUMENTS

| 8,126,287 | B2 * | 2/2012 | Alon | G02B 27/0012 348/240.3 |
| 8,503,801 | B2 * | 8/2013 | Schiller | G06T 11/60 382/228 |
| 8,818,082 | B2 * | 8/2014 | Schiller | G06T 11/60 382/159 |
| 8,885,941 | B2 * | 11/2014 | Schiller | G06T 5/003 382/180 |

OTHER PUBLICATIONS

Bae, et al., "Defocus magnification", Computer Graphics Forum, vol. 26, No. 3, 2007, 9 pages.
Boykov, et al., "Fast Approximate Energy Minimization via Graph Cuts", IEEE Transactions on Pattern Analysis and Machine Intelligence, vol. 23, No. 11, Nov. 2001, pp. 1-18.
Chakrabarti, et al., "Analyzing Spatially-varying Blur", Proceedings of IEEE 2 Conferences on Computer Vision and Pattern Recognition (CVPR). San Francisco, CA. Jun. 3-18, 2010. pp. 2512-2519, Jun. 2010, 8 Pages.
Fergus, et al., "Removing Camera Shake from a Single Photograph", Retrieved from <http://people.csail.mit.edu/fergus/papers/deblur_fergus.pdf> on Nov. 28, 2012, 2006, 8 pages.
Levin, et al., "Image and Depth from a Conventional Camera with a Coded Aperture", ACM Transactions on Graphics, SIGGRAPH 2007 Conference Proceedings, San Diego, CA, Retrieved from <http://groups.csail.mit.edu/graphics/CodedAperture/CodedAperture-LevinEtAl-SIGGRAPH07.pdf> on Dec. 21, 2012, 2007, 9 pages.

(Continued)

*Primary Examiner* — Anh Do
(74) *Attorney, Agent, or Firm* — Wolfe-SBMC

(57) ABSTRACT

Image defocus blur estimation techniques are described. In one or more implementations, fixed spatial frequencies that are usable to analyze an image for blur are selected. The selected spatial frequencies are input to a function used to determine frequency responses for pixels of the image. The frequency responses indicate a response of the pixels around a given pixel to the selected spatial frequencies. The spatial frequencies that are selected may be limited to spatial frequencies having a frequency magnitude from a set of discrete values. The discrete values may, for instance, range from a minimum frequency magnitude to a maximum frequency magnitude, and be spaced apart by a frequency magnitude increment. A number of frequencies that are selected at each magnitude may also be based on the frequency magnitude increment.

20 Claims, 7 Drawing Sheets

(56) References Cited

OTHER PUBLICATIONS

Levin, et al., "Understanding and evaluating blind deconvolution algorithms", Retrieved from <http://www.wisdom.weizmann.ac.il/~levina/papers/deconvLevinEtalCVPRO9.pdf>, 2009, 8 pages.

Potmesil, et al., "Synthetic Image Generation with a Lens and Aperture Camera Model", ACM Transactions on Graphics, vol. 1, No. 2, Apr. 1982, pp. 85-108.

Rajagopalan, et al., "Depth Estimation and Image Restoration Using Defocused Stereo Pairs", PAMI, vol. 26, No. 11, Nov. 2004., pp. 1521-1525.

Rhemann, et al., "A Perceptually Motivated Online Benchmark for Image Matting", in CVPR, Jun. 2009. [Online]. Available: http://www.alphamatting.com/, Jun. 2009, 8 pages.

Shan, et al., "High-quality Motion Deblurring from a Single Image", ACM Transactions on Graphics (TOG)—Proceedings of ACM SIGGRAPH vol. 27 Issue 3, Article No. 73, Aug. 2008, pp. 73:1-73:10.

Whyte, et al., "Non-Uniform Deblurring for Shaken Images", IEEE Conference on Computer Vision and Pattern Recognition (CVPR), Dec. 2008, 8 pages.

Xu, et al., "Two-Phase Kernel Estimation for Robust Motion Deblurring", Proceedings ECCV 2010, 2010, 14 pages.

Zoran, et al., "Scale invariance and noise in natural images", IEEE International Conference on Computer Vision, Sep. 2009, 8 pages.

\* cited by examiner

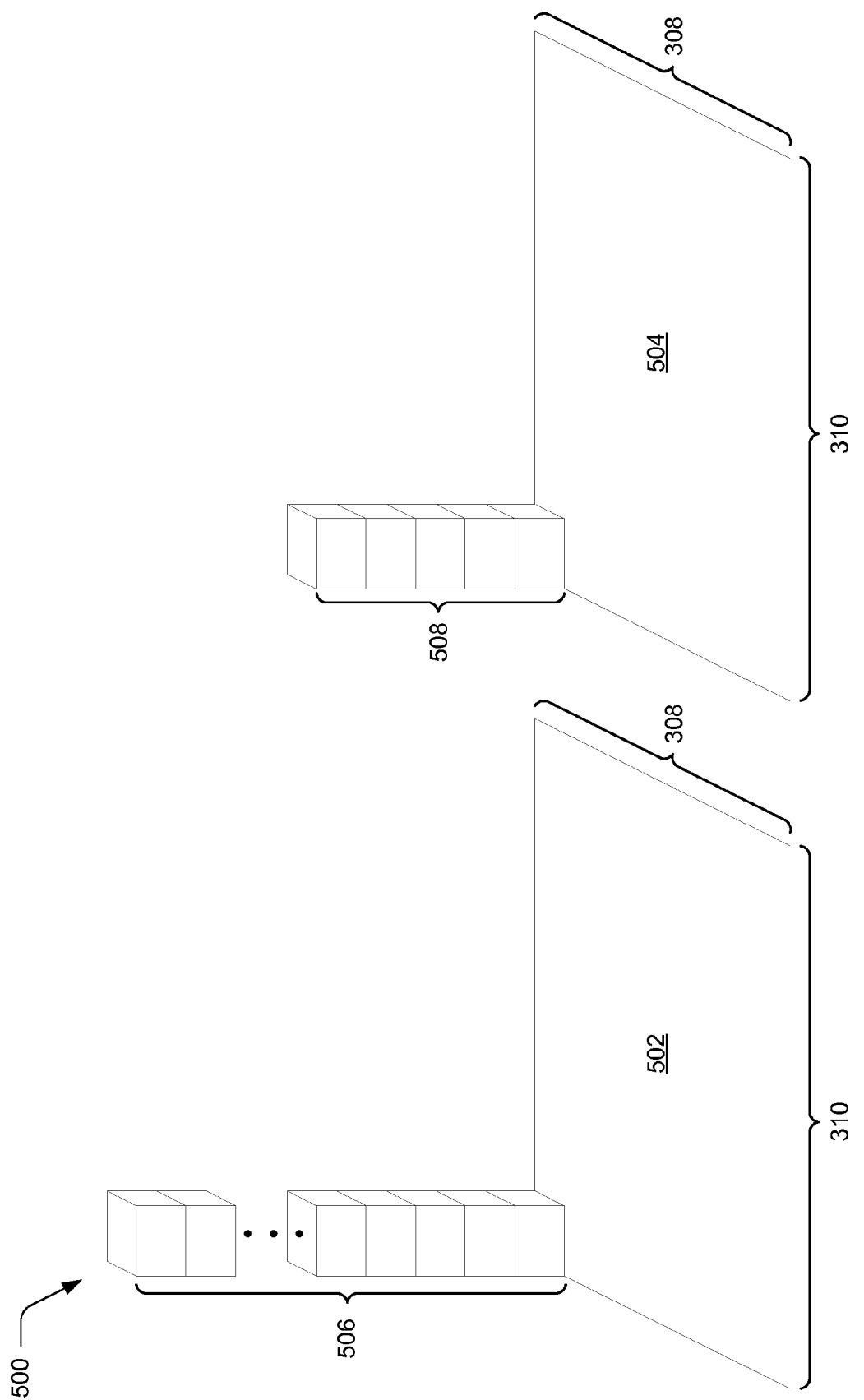

600 ⤵

602
Identify an image for which an amount of blur due to lens defocus is to be estimated

▼

604
Select spatial frequencies that are useable to analyze the image for blur, the spatial frequencies selected having frequency magnitudes from a set of discrete values spaced apart by a frequency magnitude increment

▼

606
Determine frequency responses for the pixels of the image that indicate a response of pixels around a given pixel to the selected frequencies

▼

608
Use the frequency responses to compute probabilities that a given pixel of the image is blurred with different blur disc radii that correspond to different amounts of blur caused in an image by lens defocus

▼

610
Based in part on the probabilities, choose the blur disc radii that most likely blurred each pixel of the image, the choosing effective to estimate an amount of blur caused by lens defocus at each pixel of the image

▼

612
Recover a blur map estimation for the image based on the chosen blur disc radii

*Fig. 6*

IMAGE DEFOCUS BLUR ESTIMATION

BACKGROUND

Images, or portions thereof, may be blurry for a variety of reasons. An image may be blurry due to motion blur, for example. Motion blur may be present when an object captured in an image moves relative to a camera capturing the image over a period of exposure, e.g., a period of time during which the camera's shutter is open and film or an imaging sensor is exposed to incoming light.

An image may also be blurry due to defocus blur. Defocus blur may be present in an image, for instance, due to a camera's depth of field (DOF), which refers to a distance between the nearest and farthest objects in a scene that appear sharp in an image captured by the camera. Objects within a camera's DOF appear sharp in an image, while objects in front of and beyond the camera's DOF appear blurry.

Regardless of a cause of blur, its estimation may have a variety of applications. Estimation of defocus blur may be useful, for instance, to detect and segment an in-focus subject from an out-of-focus background of an image. To convey the results of estimating defocus blur, a defocus blur map may be generated. However, conventional techniques for estimating defocus blur and for generating a defocus blur map can consume significant computing resources. Consequently, defocus blur estimation may not be suitable for some applications.

SUMMARY

Image defocus blur estimation techniques are described. In one or more implementations, fixed spatial frequencies that are usable to analyze an image for blur are selected. The selected spatial frequencies are input to a function used to determine frequency responses for pixels of the image. The frequency responses indicate a response of the pixels around a given pixel to the selected spatial frequencies. The spatial frequencies that are selected may be limited to spatial frequencies having a frequency magnitude from a set of discrete values. The discrete values may, for instance, range from a minimum frequency magnitude to a maximum frequency magnitude, and be spaced apart by a frequency magnitude increment. A number of frequencies that are selected at each magnitude may also be based on the frequency magnitude increment.

Once the frequency responses are determined and blur disc radii corresponding to different amounts of blur caused in an image by lens defocus are selected, probabilities may be computed that indicate a likelihood each pixel of an image was blurred with the blur disc radii. Based in part on the probabilities, the blur disc radii that most likely blurred each pixel may be chosen. A smoothness constraint that affects a smoothness of the blur between each pixel may also serve as a basis for choosing one of the blur disc radii. In any case, an amount of blur that is caused by lens defocus can be estimated at each pixel of the image based on the chosen blur disc radii.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description makes reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 illustrates an example of a frequency response image for which spatial frequency responses are computed using one technique and a different image for which spatial frequency responses are computed according to a different technique.

FIG. 6 is a flow diagram depicting a procedure in an example implementation in which spatial frequencies and blur disc radii that correspond to different amounts of defocus blur are computed to estimate an amount of blur caused by lens defocus at each pixel of an image.

DETAILED DESCRIPTION

Overview

Figure 1:
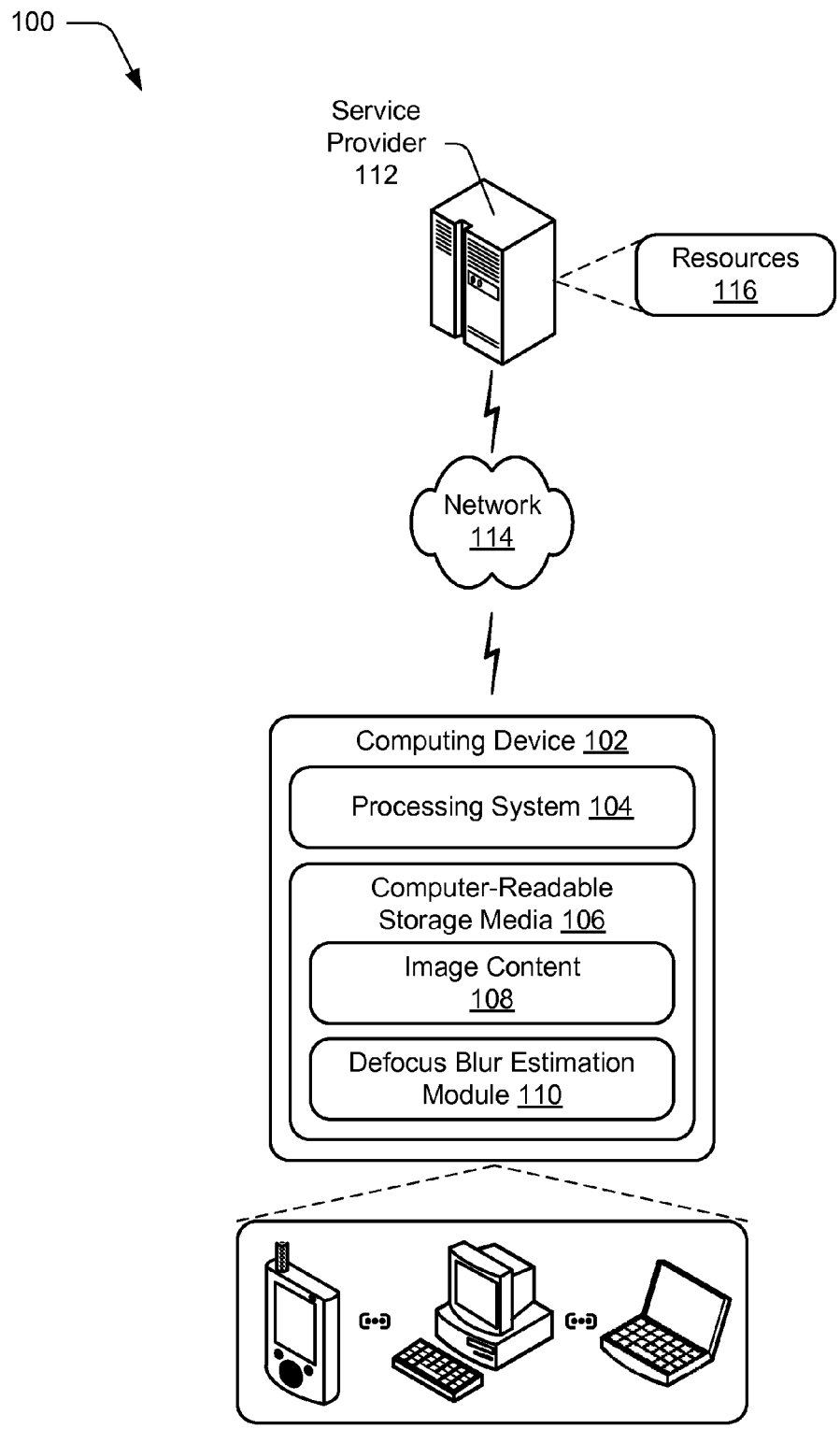
FIG. 1 is an illustration of an environment in an example implementation that is operable to employ techniques described herein.

Estimating defocus blur of an image may have a variety of applications, such as to detect and segment an in-focus subject from an out-of-focus background of an image. In an image, defocus blur may be present due to a camera's depth of field (DOF), which refers to a distance between the nearest and farthest objects in a scene that appear sharp in an image captured by the camera. In other words, objects within a camera's DOF appear sharp in an image, while objects in front of and beyond the camera's DOF appear blurry. Regardless of a cause, conventional techniques for estimating defocus blur typically consume significant computing resources. For example, conventional techniques for estimating defocus blur may be time consuming and use a substantial amount of memory. Consequently, these techniques may be unsuitable for some implementations.

Image defocus blur estimation techniques are described. In one or more implementations, defocus blur that is caused by lens defocus is estimated at each pixel of an image. To do so, spatial frequencies may be selected to analyze the image for amounts of blur. Blur disc radii that correspond to different amounts of blur caused in an image by lens defocus may also be selected. For the pixels of the image, frequency responses may be determined that indicate a response of pixels around a given pixel to the selected frequencies. By way of example, the frequency responses may be determined according to a filter kernel that is a product of a Gaussian window function with a complex sinusoid. The Gaussian window may have a standard deviation of 8 to 15 pixels, for instance, and define a circular neighborhood over which the frequency response at a given pixel will be determined. The spatial frequencies selected may thus define a two-dimensional (2D) frequency transform of the neighborhood covered by the Gaussian window.

Unlike conventional techniques which select frequencies with reference to a Cartesian grid, the techniques described herein involve selection of frequencies that are equally spaced on a polar grid. To do so, selection of the spatial frequencies may be limited to frequencies with magnitudes from a set of discrete values. In particular, the discrete values of the set may range from a minimum frequency magnitude to a maximum frequency magnitude, and be spaced apart by a frequency magnitude increment. Further, a frequency table may be constructed to maintain the selected frequencies, and enable access to the spatial frequencies to determine the frequency responses.

Conventional techniques for determining frequency responses may involve generation of a frequency response image that includes, for each pixel of the image, an array in which each of the frequencies selected occupies a block of the array. Thus, when 50-200 frequencies are selected, conventional techniques result in a 50-200 channel frequency response image. In contrast, the techniques described herein generate an image having fewer channels than conventionally-generated frequency response images. In particular, the techniques described herein generate images having a number of channels that corresponds to a Number of Distinct Frequency Magnitudes (NFM) of the selected frequencies.

Regardless of whether the frequencies are selected with reference to a polar grid or a Cartesian grid, the techniques described herein may reduce a number of channels of the image generated to NFM channels. When frequencies are selected with reference to a polar grid as described below, an NFM-channel image having 7-8 channels may result. Even if the frequencies are selected with reference to a Cartesian grid as described below, an NFM-channel image having fewer channels than a conventionally-generated frequency response image may result, e.g., 23 channels rather than 50-200. Still further, the frequencies may be selected without reference to either a polar or Cartesian grid. Rather the frequencies may be selected in another way, e.g., a technique that enables frequencies to be selected so that the frequency space under consideration is covered by selected frequencies that are about a pre-determined frequency increment apart. In any case, an image having NFM channels may be generated for the frequencies selected in this other way.

Once the frequency responses are determined, the frequency responses may be used to estimate an amount of blur caused by lens defocus at each pixel of the image. In particular, the frequency responses may be used to compute probabilities for each pixel in the image that are indicative of a likelihood that each of the selected blur disc radii blurred the pixel. Unlike conventional techniques in which a larger number of individual frequencies are used to compute the probabilities, the techniques described herein compute the probabilities using a smaller number of frequency responses from an NFM-channel image. Based on the probabilities and a smoothness constraint to smooth the blur between pixels, blur disc radii may be chosen for the pixels. Accordingly, the amount of blur corresponding to the chosen blur disc radii may be indicative of the amount of blur caused by lens defocus at the pixels.

The estimated amount of defocus blur for each pixel may be used for a variety of applications. For example, the amount of blur estimated for each pixel may be used to generate a mask that may be applied to the original image to segment the image. In particular, the estimated amount of blur may be used to segment foreground portions of the image from background portions of the image. Doing so may enable the foreground or background portions of the image to be selected, e.g., for performing photo-editing operations on the selected foreground or background via a photo editing application.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that may include one or more processing devices (e.g., processors) and one or more computer-readable storage media 106. The illustrated environment 100 also includes image content 108 and a defocus blur estimation module 110 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processing resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 7.

The environment 100 further depicts one or more service providers 112, configured to communicate with computing device 102 over a network 114, such as the Internet, to provide a "cloud-based" computing environment. Generally speaking, service providers 112 are configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, photo editing services, image illustrating services, photo printing services (e.g., Snapfish®, Shutterfly®, and the like), photo storage and/or sharing services Flickr®), social network services (e.g., Facebook®, Twitter®, Instagram®, Hyperlapse®, and the like), and so forth.

These service providers 112 may thus serve as sources of significant amounts of image content. Image content 108 may represent image content from these sources and which may be formatted in any of a variety of image formats, including but not limited to JPEG, TIFF, RAW, GIF, BMP, PNG, and so on. The image content made available through the services may be posted by users that have accounts with those services. For example, a user having an account with a photo storage and/or sharing service may upload images, such as those taken with a digital camera of the user, or those sent to the user via electronic means. A user of the photo storage and/or sharing service may then share their uploaded images with others, such as by providing a link to photo albums or to a profile of the user.

The defocus blur estimation module 110 represents functionality to implement image defocus blur estimation techniques as described herein. For example, the defocus blur estimation module 110 may be configured in various ways to estimate an amount of blur caused by lens defocus at each pixel of an image. Doing so may be useful for a variety of applications, such as to segment foreground portions of the image from background portions of the image. As part of estimating the blur due to defocus, blur disc radii which correspond to different amounts of blur may be chosen for each pixel. The blur disc radii chosen for a given pixel may be the blur disc radii that most likely blurred the pixel.

The defocus blur estimation module 110 also represents functionality to compute probabilities that a given pixel was blurred by the blur disc radii using frequency responses. The frequency responses may indicate a response of pixels that neighbor a given pixel to selected spatial frequencies. The frequency responses may be determined according to a function. By way of example, the defocus blur estimation module 110 may determine the frequency responses according to a filter kernel that is a product of a Gaussian window function with a complex sinusoid.

In accordance with the techniques described herein, the defocus blur estimation module 110 may select frequencies for defining the 2D frequency of the complex sinusoid that are equally spaced on a polar grid. To limit the selected spatial frequencies to those that are equally spaced on a polar grid, the defocus blur estimation module 110 may select spatial frequencies that have magnitudes from a set of discrete values. The discrete values of the set may, for instance, range from a minimum frequency magnitude to a maximum frequency magnitude, and be spaced apart by a frequency magnitude increment.

In addition, the defocus blur estimation module 110 represents functionality to create a frequency table of the selected spatial frequencies. To create the frequency table, the defocus blur estimation module 110 may first initialize the frequency table to empty. The defocus blur estimation module 110 may then select spatial frequencies to add to the table. For example, the defocus blur estimation module 110 may add a first spatial frequency to the frequency table that has a frequency magnitude of the minimum frequency magnitude. The defocus blur estimation module 110 may also add additional frequencies to the frequency table having a frequency magnitude of the minimum frequency magnitude. A number of frequencies that are added to the frequency table with the minimum frequency magnitude may be based on a number of points that are no closer than the frequency magnitude increment apart and that fit on a circle that corresponds to the minimum frequency magnitude. The defocus blur estimation module 110 may then add spatial frequencies to the frequency table that have a frequency magnitude equal to the sum of the minimum frequency magnitude and one frequency magnitude increment. A number of frequencies added at this frequency magnitude may be based on a number of points that are no closer than the frequency magnitude increment apart and that fit on a circle that corresponds to the minimum frequency magnitude and one frequency magnitude increment. The defocus blur estimation module 110 may then add spatial frequencies to the frequency table that have a frequency magnitude equal to the sum of the minimum frequency magnitude and two frequency magnitude increments.

The defocus blur estimation module 110 may continue on in this fashion until the sum of the minimum frequency magnitude and the integer-number of frequency magnitude increments surpasses the maximum frequency magnitude. The defocus blur estimation module 110 does not add a spatial frequency to the table that has a frequency magnitude greater than the maximum frequency magnitude. By selecting the spatial frequencies in this way, the number of values in the frequency table may be limited, e.g., generally to spatial frequencies having 7 or 8 distinct frequency magnitudes even though 50-200 frequencies may be selected. Regardless of the spatial frequencies added to the frequency table, the defocus blur estimation module 110 may be configured to access the added frequencies from the frequency table for input to determine the frequency responses.

Furthermore, the defocus blur estimation module 110 represents functionality to compute a variety of intermediate data that can be used in conjunction with choosing which of the blur disc radii most likely blurred each pixel of an image. By way of example, the defocus blur estimation module 110 represents functionality to compute a probability that each of the blur disc radii blurred a pixel. The defocus blur estimation module 110 may, in particular, compute such a probability for each of the blur disc radii at each pixel. Using the computed probabilities, as well as a smoothness constraint, the defocus blur estimation module 110 may choose one of the blur disc radii that most likely blurred each pixel. In doing so, the defocus blur estimation module 110 may effectively estimate an amount of blur due to lens defocus at each pixel of the image.

The defocus blur estimation module 110 may be implemented as a software module, a hardware device, or using a combination of software, hardware, firmware, fixed logic circuitry, etc. Further, the defocus blur estimation module 110 may be implemented as a standalone component of the computing device 102 as illustrated. In addition or alternatively, the defocus blur estimation module 110 may be configured as a component of a web service, an application, an operating system of the computing device 102, a plug-in module, or other device application as further described in relation to FIG. 7.

Having considered an example environment, consider now a discussion of some example details of the techniques for image defocus blur estimation in accordance with one or more implementations.

Image Defocus Blur Estimation Details

Figure 2:
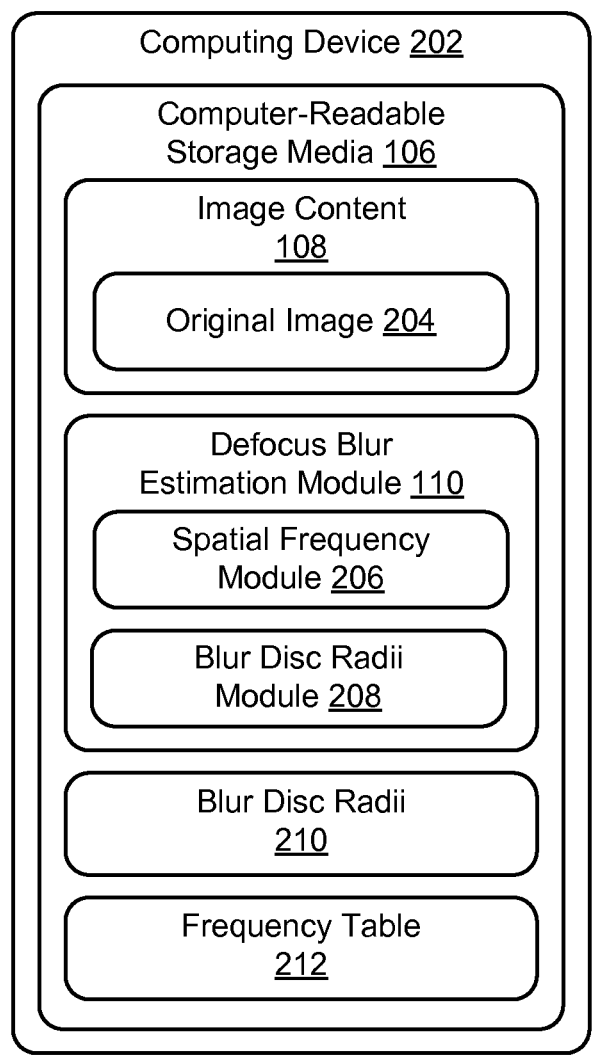
FIG. 2 illustrates from the environment of FIG. 1 a computing device having a defocus blur estimation module and the components thereof in greater detail.

This section describes some example details of image defocus blur estimation techniques in accordance with one or more implementations. FIG. 2 depicts generally at 200 some portions of the environment 100 of FIG. 1, but in greater detail. In particular, the computer-readable storage media 106 and the components included therein are depicted in greater detail.

In FIG. 2, the computer-readable storage media 106 is included as part of computing device 202 and includes the image content 108 and the defocus blur estimation module 110. The image content 108 is illustrated with original image 204, which may correspond to an image captured by a camera of the computing device or one received via electronic means by the computing device. The defocus blur estimation module 110 is illustrated with a spatial frequency module 206 and a blur disc radii module 208. These modules represent functionality of the defocus blur estimation module 110 and it should be appreciated that such functionality may be implemented using more or fewer modules than those illustrated. The discussion of the defocus blur estimation module 110 and its components refers to FIGS. 3-5, which illustrate concepts pertinent to the functionality of these modules. The computer-readable-storage media 106 also includes blur disc radii 210 and frequency table 212, which may be generated by the defocus blur estimation module 110 and the components thereof as discussed below.

In general, the defocus blur estimation module 110 may be configured to estimate an amount of blur due to lens defocus at different locations of a scene. For the original image 204, for instance, the defocus blur estimation module 110 may be configured to estimate an amount of blur due to lens defocus at each pixel of the original image 204. Using the techniques described herein, the defocus blur estimation module 110 may estimate blur due to lens defocus faster than conventional techniques.

Due to the faster computation, estimated amounts of defocus blur may be used in applications for which its use was previously not feasible. For instance, the defocus blur estimation module 110 may be configured to estimate an amount of defocus blur for a scene, such as a scene displayed via a view finder of a camera in real time. In addition to enabling display of an in-focus version of a scene for image capture, such estimation may enable an in-focus version of a scene captured through a video camera to be recovered in real time. Consequently, the image defocus blur estimation techniques described herein may, in addition to image focusing and segmentation, be applicable in security systems, night vision, and so forth. The image defocus blur estimation techniques described herein may have a variety of other applications without departing from the spirit or scope of those techniques.

Figure 3:
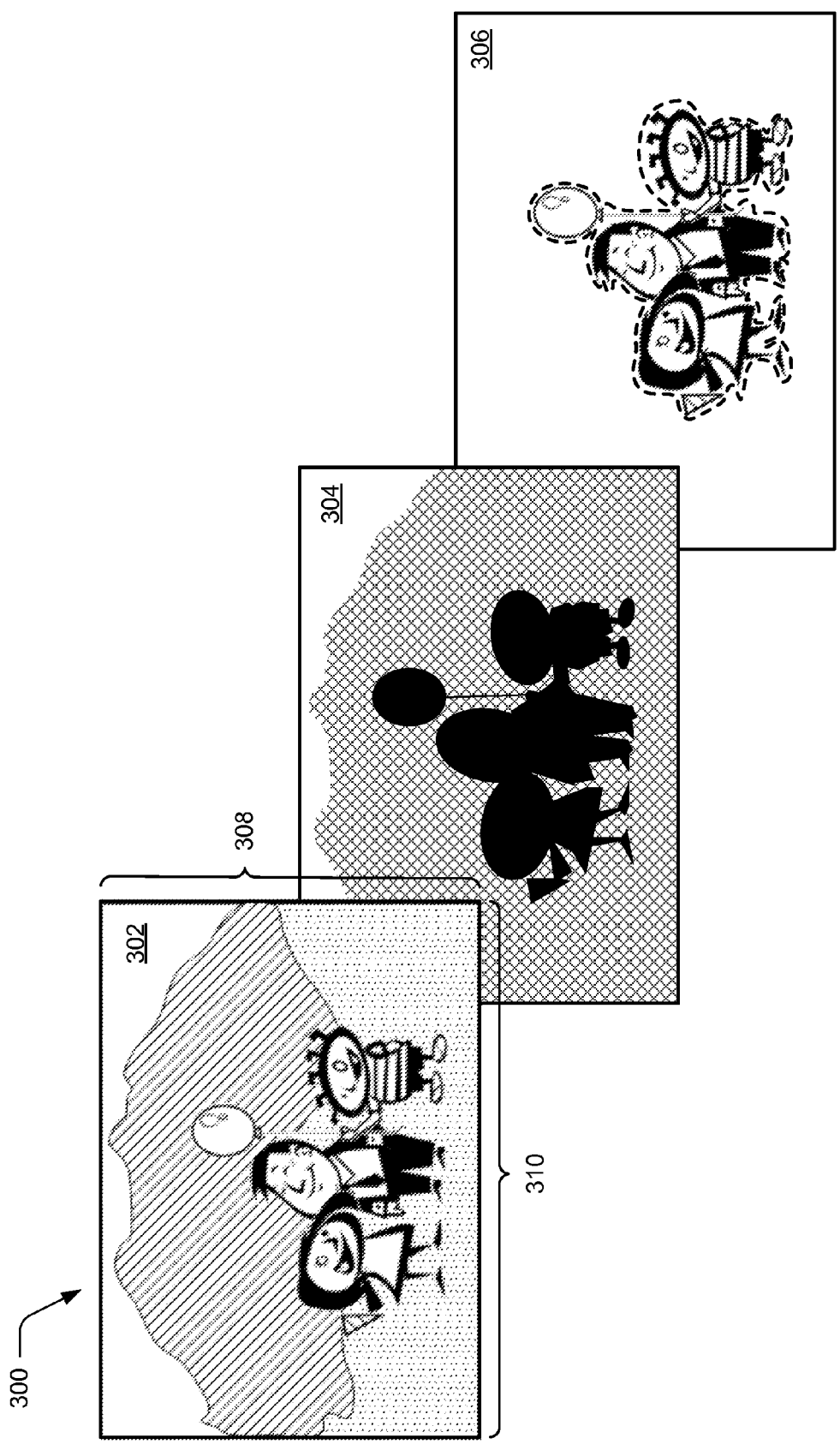
FIG. 3 illustrates an example of an original image, a defocus blur map estimation, and a segmented image in which an in-focus foreground object is selected from an out-of-focus background based on the defocus blur map estimation.

FIG. 3 illustrates at 300 an example of an original image, a defocus blur map estimation, and a segmented image in which an in-focus foreground object is selected from an out-of-focus background based on the defocus blur map estimation. In particular, FIG. 3 includes original image 302, defocus blur map estimation 304, and segmented image 306. The original image 302 may correspond to the original image 204 that is maintained as part of the image content 108. Dimensions of the original image 302 are also referenced in the illustrated example. In this example, the dimensions of the original image 302 are height 308 and width 310. The height 308 and width 310 may be referred to in a pixelwise manner for the purposes of discussion. By way of example, the height 308 of the original image 302 may be 900 pixels and the width 310 may be 1200 pixels.

In any case, the defocus blur estimation module 110 may be configured to generate the defocus blur map estimation 304, in part, by estimating an amount blur due to lens defocus at each pixel of the original image 302. To estimate the amount of blur, the defocus blur estimation module 110 may compute fixed spatial frequencies and fixed blur disc radii, such as the blur disc radii 210.

To compute the fixed spatial frequencies and the fixed blur disc radii, the defocus blur estimation module 110 may first obtain an image for which the amount of blur is to be estimated, e.g., original image 302. In one or more implementations, the defocus blur estimation module 110 may be configured to convert the original image, if in color, to gray scale. Alternately, the defocus blur estimation module 110 may be configured to process each color plane of the image independently and combine the results. In addition, the defocus blur estimation module 110 may be configured to resize the image under consideration to have a smaller size. Converting the image under consideration to grey scale and resizing the image to a smaller size may be effective to further reduce a computation time for estimating defocus blur of the image.

Prior to computing the fixed spatial frequencies and the fixed blur disc radii, the defocus blur estimation module 110 may estimate a noise in the input image. The noise computed by the defocus blur estimation module 110 represents an estimated background root mean square (RMS) noise. This may typically be a result of a combination of camera sensor noise and the effects of quantization of analog levels to integer levels in the digital image representation. For example, it may be at least partially the result of an analog-to-digital conversion operation or the result of variations in lighting across the image captured by a camera. The defocus blur estimation module 110 may use the estimated noise in conjunction with the fixed spatial frequencies and the fixed blur disc radii to estimate the defocus blur for each pixel of the image.

To compute the fixed spatial frequencies, the defocus blur estimation module 110 may employ the spatial frequency module 206. The spatial frequency module 206 represents functionality of the defocus blur estimation module 110 to compute the fixed spatial frequencies and to compute local frequency responses per pixel of the image under consideration. As part of computing the fixed spatial frequencies, the spatial frequency module 206 is configured to generate a frequency table, e.g., the frequency table 212. To do so, the spatial frequency module 206 chooses a discrete set of spatial frequencies that are used to analyze the image under consideration for defocus blur.

Given that the frequency responses computed by the spatial frequency module 206 correspond to a Gabor filter, the filter kernel of which is a product of a Gaussian window function and a complex sinusoid, the spatial frequency module 206 may choose spatial frequencies using a standard deviation of the Gaussian window as input. The complex sinusoid may have a two-dimensional (2D) frequency f such that $f=(F_x, F_y)$ By "complex sinusoid" it is meant that there is a real and imaginary output, such that the real part corresponds to the cosine of the given spatial frequency and the imaginary part corresponds to the sine of the given spatial frequency. The real part of the complex sinusoid may be defined according to the following:

$$\cos(xF_x+yF_y)$$

The imaginary part of the complex sinusoid may be defined according to the following:

$$\sin(xF_x+yF_y)$$

In these formulas, (x, y) may give the pixel position of an image. By way of example, (0, 0) may correspond to the pixel in the upper-left corner of an image and (1, 0) may correspond to a pixel in the upper row of pixels but that is one pixel to the right of the upper-left pixel of the image. In one or more implementations, the Gaussian window may be computed according to the following formula:

$$\exp(-0.5(x^2+y^2)/(\sigma^2))$$

Here, (x, y) may again give the pixel position of an image, and σ represents a standard deviation of the window in pixels. The spatial frequency module 206 may use a variety of standard deviations for the window. The spatial frequency module 206 may scale the standard deviation, for instance, based on a size of the image. By way of example, the spatial frequency module 206 may use a standard deviation of ten pixels for most images, but may use different values for the standard deviation with images having relatively high or relatively low resolutions. Moreover, if the blurs analyzed by the defocus blur estimation module 110 are relatively large, then the spatial frequency module 206 may use a larger standard deviation. In contrast, if the blurs analyzed by the defocus blur estimation module 110 are relatively small, then the spatial frequency module 206 may use a smaller standard deviation.

Given the Gaussian window function defined in this way and the complex sinusoid definitions, the filter kernel may have a real part defined according to the following:

$$\cos(xF_x+yF_y)\exp(-0.5(x^2+y^2)/\sigma^2))$$

In addition, the filter kernel may have an imaginary part defined according to the following:

$$\sin(xF_x+yF_y)\exp(-0.5(x^2+y^2)/\sigma^2))$$

In one or more implementations, the defocus blur estimation module 110 may compute filter kernel values in a square with a radius of four times the standard deviation a around (0, 0). This is due to the Gaussian window tapering down to a value approaching zero when the (x, y) location is greater than four times the standard deviation from (0, 0).

In general, a number of spatial frequencies chosen by the spatial frequency module 206 may be determined from the standard deviation of the Gaussian window, which in turn defines a size of a region around each pixel that is to be analyzed for blur. Conventional techniques for selecting spatial frequencies in conjunction with estimating defocus blur may condition selection of spatial frequencies so that the selected spatial frequencies are at least a certain distance apart and cover a range of possible frequencies in a cycle period, e.g., between about four pixels and twice the standard deviation of the Gaussian window—twenty pixels. However, conventional techniques may do so by selecting spatial frequencies from a grid of equally spaced values in frequency space. Said another way, spatial frequency selection performed in this way selects the spatial frequencies according to a Cartesian grid.

By way of example, spatial frequencies may be selected according to conventional techniques such that $F_x$ and $F_y$ take on values of the form $kF_{inc}+F_0$. Here, the spacing between the frequencies for pixel P at location i is determined by $F_{inc}$, the value of which may range from $$\frac{1}{\pi\sigma}$$

to $$\frac{2}{\pi\sigma}$$

where $\sigma$ is the standard deviation of the Gaussian window. The term $F_0$ corresponds to a minimum frequency, which is computed in substantially a same way as $F_{inc}$, but may be adjusted by a constant scale factor in a range from 1 to 2. According to conventional techniques, the minimum frequency may correspond to a frequency with the maximum period. By way of example, the maximum period may be 20 pixels and the minimum frequency may be 1/20 cycles per pixel. Additionally, the term k may vary according to such conventional techniques from one to a maximum value such that $kF_{inc}+F_0$ is less than the maximum frequency, e.g., a period of four pixels. The result of selecting spatial frequencies in this way, is to select 50 to 200 complex values per pixel. In any case, both the minimum frequency and the maximum frequency are determined based on the standard deviation $\sigma$ of the Gaussian window.

Figure 4:
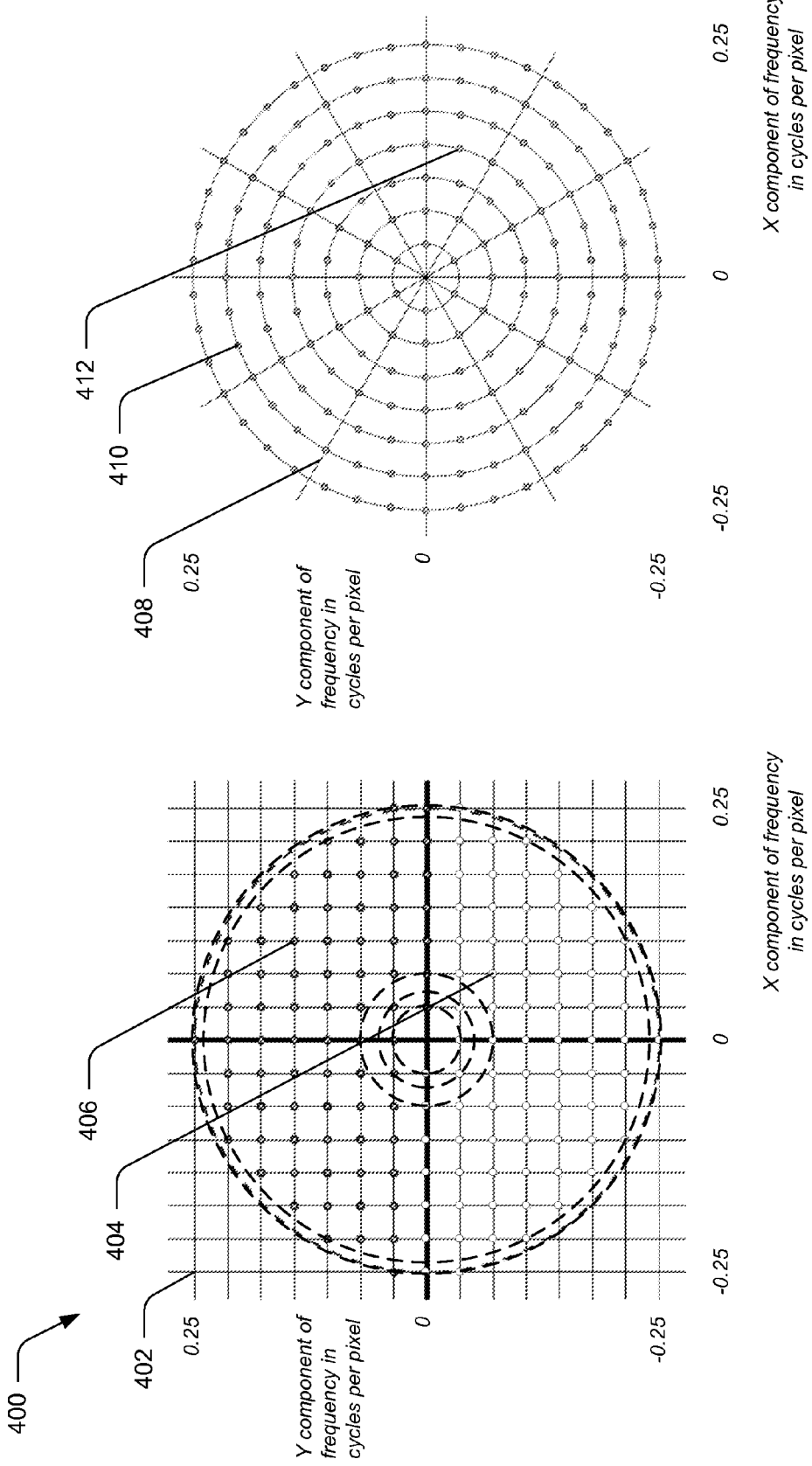
FIG. 4 illustrates an example of frequencies selected on a Cartesian grid and frequencies selected on a polar grid.

In contrast to conventional techniques, the spatial frequency module 206 may select spatial frequencies that are equally spaced on a polar grid. FIG. 4 illustrates at 400 an example of frequencies selected on a Cartesian grid and frequencies selected on a polar grid. In the illustrated example, a Cartesian grid 402 has several frequencies selected, such as frequencies 404, 406. Further, the illustrated example includes a polar grid 408, which is also depicted having several frequencies selected, such as frequencies 410, 412. In this particular example, the Cartesian grid 402 has 152 frequencies and the polar grid 408 has 168 frequencies.

However, the frequencies of the Cartesian grid 402 may be grouped into 23 different frequency magnitude bins whereas the frequencies of the polar grid 408 may grouped into just 7 different frequency magnitude bins. As used herein, a "frequency magnitude bin" refers to a group of selected frequencies that have a same frequency magnitude. In both the Cartesian grid 402 and the polar grid 408, the frequency magnitude may correspond to a distance from the origin of the grid to a given frequency.

In the illustrated example, the frequency magnitude bins, into which the frequencies of the Cartesian grid 402 may be grouped, are represented by circles with dashed lines centered relative to the origin of the Cartesian grid 402. For illustration purposes, however, just a subset of the frequency magnitude bins into which the frequencies of the Cartesian grid may be grouped are represented, e.g., just the inner and outer three frequency magnitude bins are represented. In contrast, the frequency magnitude bins, into which the frequencies of the polar grid 408 may be grouped, are represented by circles with solid lines centered relative to the origin of the polar grid 408. By grouping the selected frequencies into fewer frequency magnitude bins, computation time may be saved, e.g., when computing a probability that a given pixel is blurred by a particular blur disc radii as described below.

In any case, the spatial frequency module 206 may add one or more frequencies to the frequency table 212 at each frequency magnitude but in different directions. The effect of doing so is to select spatial frequencies that are equally spaced on a polar grid, e.g., as represented by FIG. 4. For instance, the spatial frequency module 206 may add to the frequency table 212 an integral number of frequencies that are equally spaced in the angle coordinate of the polar coordinate system, e.g., in terms of radius and angle relative to the origin. The spatial frequency module 206 may also select frequencies so that a spacing of the frequencies, in terms of the angle coordinate (e.g., in radians), approximates the spacing of the magnitude coordinate. By selecting frequencies in this way, the selected frequencies are evenly spaced, in terms of angle, around a circle with a radius of a given magnitude.

To this extent, the spatial frequency module 206 limits its selection to spatial frequencies having a magnitude from a set of discrete values. In general, the frequency response of a Gabor filter for the frequency $(-F_x, -F_y)$ will be the complex conjugate of the Gabor filter $(F_x, F_y)$. In other words, the real part of the Gabor filter for $(-F_x, -F_y)$ will be the same as that of $(F_x, F_y)$, and the imaginary part of the Gabor filter for $(-F_x,$ $-F_y$) will simply be the negation of that for ($F_x$, $F_y$). Since the square of the magnitude of the frequency response is used, however, the resulting number will be the same for Gabor filters ($F_x$, $F_y$) and ($-F_x$, $-F_y$). This is the case regardless of whether the frequencies are chosen from the Cartesian grid, from the polar grid, or chosen using a different method. In other words, when the real and imaginary parts of the frequency response are squared, the results are the same. Consequently, when selecting frequencies from either the Cartesian grid or the polar grid, just half of the frequencies shown in FIG. 4 are selected. In particular, the spatial frequency module 206 selects solely the positive frequencies, e.g., the frequencies from the upper portion of the $F_y$ plane.

As noted above, the spatial frequency module 206 may add the selected frequencies the frequency table 212. To generate the frequency table 212, the spatial frequency module 206 may configure the frequency table 212 to be expandable and initially empty. For a given frequency magnitude fm, which starts at a value equal to the minimum frequency magnitude $fm_0$, may go up to the maximum frequency magnitude $fm_1$, and is set in steps of the frequency magnitude increment df, the spatial frequency module 206 may compute a maximum number of equally spaced points nPts on a half circle that are no closer than the frequency magnitude increment df. By way of example, these equally spaced points nPts may correspond to the frequencies on a given circle of the polar grid 408. The number of points nPts may be computed by the spatial frequency module 206 according to the following equation:

$$nPts = \text{floor}\left(\pi \frac{fm}{df}\right)$$

Given the number of points nPts, the spatial frequency module 206 may compute an x-component of a new spatial frequency ($F_x$, $F_y$). For each i-th point (iPt), from zero up to nPts in increments of one, the x-component may be computed according to the following:

$$F_x = fm\cos\left(\pi \frac{iPt}{nPts}\right)$$

Further, the spatial frequency module 206 may compute a y-component of the new spatial frequency ($F_x$, $F_y$). For each i-th point (iPt), from zero up to nPts in increments of one, the y-component may be computed according to the following:

$$F_y = fm\sin\left(\pi \frac{iPt}{nPts}\right)$$

Once a spatial frequency ($F_x$, $F_y$) is computed in this way, the spatial frequency module 206 may add data indicative of the computed frequency to the frequency table 212. Further, by computing the spatial frequencies in this way, the spatial frequency module 206 ensures that the magnitudes of the spatial frequencies have values that are a sum of the minimum frequency magnitude $fm_0$ and an integer-multiple of the frequency magnitude increment df. In other words, the magnitudes of the spatial frequencies are of the form $fm_0+k*df$, where k is an integer value that increases by one in conjunction with selecting spatial frequencies of a given frequency magnitude and adding those frequencies to the frequency table 212. The minimum frequency magnitude and frequency magnitude increment may be defined so that k takes on 7-8 distinct values.

Independent of computing the frequency table 212, the defocus blur estimation module 110 may also generate a table of blur disc radii, which may correspond to the blur disc radii 210. To do so, the defocus blur estimation module 110 may employ the blur disc radii module 208. The blur disc radii module 208 represents functionality of the defocus blur estimation module 110 to compute the fixed blur disc radii and probabilities that a given pixel is blurred by the blur disc radii. As part of computing the blur disc radii 210, the blur disc radii module 208 initially selects a discrete set of blur disc radii that cover a range of blurs to be analyzed. The blur radii may be computed according to user input or default settings, which specify a size for the blur disc radii to cover the range of blurs that are to be analyzed. By way of example, the blur disc radii may be 1, 2, 3 . . . 7, 8, and so on pixels in radius.

Having computed the frequency table 212 and the blur disc radii 210, the defocus blur estimation module 110 may employ the spatial frequency module 206 and the blur disc radii module 208 to compute the frequency responses and the blur probabilities, respectively. Computation of the frequency responses and the blur probabilities may make use of concepts and terms explained with reference to FIG. 5.

FIG. 5 illustrates at 500 an example of a frequency response image for which spatial frequency responses are computed using one technique and a different image for which spatial frequency responses are computed according to a different technique. In particular, FIG. 5 includes frequency response image 502 and NFM-channel image 504, the term "NFM" referring to a number of distinct frequency magnitudes. With reference back to FIG. 4, the number of distinct frequency magnitudes (NFM) may correspond to the number of groups into which the frequencies may be grouped using the frequency magnitude. For the polar grid 408 illustrated in FIG. 4, the NFM is seven.

In any case, the frequency response image 502 and the NFM-channel image 504 may be computed to estimate defocus blur of the original image 302. The illustrated dimensions of the frequency response image 502 and the NFM-channel image 504 may correspond to the pixelwise height 308 and width 310 of the original image 302. Accordingly, the frequency response image 502 and the NFM-channel image 504 are depicted as having dimensions equivalent to the height 308 and the width 310 of the original image 302. It is to be appreciated, however, that the height and the width of the frequency response image 502 and the NFM-channel image 504 may correspond to dimensions of a corresponding data structure configured to store information about selected spatial frequencies. By way of example, the frequency response image 502 may have dimensions H×W×N, where H corresponds to the pixelwise height 308 of the original image, W corresponds to the pixelwise width 310 of the image, and N corresponds to the number of frequencies selected, e.g., 50-200 frequencies. In the illustrated example, N is represented by blocks 506. Each "block" of the corresponding data structure may be configured to store data (e.g., floating point values) representative of a selected spatial frequency.

The data stored by each of the blocks of the frequency response image 502 may correspond to a squared frequency response. In particular, the data stored by the blocks of the frequency response image may represent a sum of squares of the real and imaginary parts of the Gabor filters discussed above. This sum of squares of the real and imaginary parts of the Gabor filters may be referred to as the "power response squared" of the filter. Thus, the frequency response image 502 holds data representative of the sum of squares of the individual Gabor filters.

In contrast, the NFM-channel image 504 may have dimensions H×W×NFM, where H corresponds again to the pixelwise height 308 of the original image and W corresponds to the pixelwise width 310 of the image, but where NFM corresponds to a number of distinct frequency magnitudes of the spatial frequencies selected, e.g., generally 7-8 for frequencies selected from the polar grid. In the illustrated example, NFM is represented by blocks 508. The number of blocks depicted is for illustration purposes and may not correspond to the exact NFM dimension. Like the frequency response image 502, each "block" of the data structure for the NFM-channel image 504 may be configured to store data (e.g., floating point values) for selected spatial frequencies. It should be appreciated that an NFM-channel image may also be computed for frequencies selected from the Cartestian gird. With reference to FIG. 4, an NFM-channel image computed for the frequencies selected from the Cartesian grid 402 would have 23 channels. Thus, using an NFM-channel image for frequencies chosen from the Cartesian grid may also reduce an amount of time to estimate blur of the image under consideration. As noted above, frequencies may be selected in other ways that do not reference a polar or Cartesian grid so long as the selected frequencies cover the frequency space under consideration. In the example illustrated in FIG. 4, the "frequency space" corresponds to the area within the largest circles of both the Cartesian grid 402 and the polar grid 404. In any case, using an NFM-channel image for frequencies chosen from the Cartesian grid or chosen in another way that does not reference the polar grid may not reduce the computation time as much as both selecting frequencies from a polar grid and computing an NFM-channel image for the frequencies selected therefrom.

Prior to computing the frequency responses, however, the defocus blur estimation module 110 may compute the term Disk[R, j], which represents a summation of frequencies in an NFM-channel image Y for a given frequency magnitude bin j. The defocus blur estimation module 110 computes Disk[R, j] based on a manner in which frequency responses are computed according to the power response squared. Rather than corresponding to the input image though, the image computed is an anti-aliased image of a disc of radius R pixels centered inside a square image, such as 4σ×4σ pixels, where σ is the standard deviation of the Gaussian window. This anti-aliased image may be referred to herein as the "disc image". Thus, pixels in the disc image that are within R pixels of the center pixel have a pixel value of one and those pixels further than R pixels of the center pixel have a pixel value of zero. When the defocus blur estimation module 110 applies the same procedure to the disc image as the input image, an NFM-channel image results with a width and height equivalent to a dimension of the square, e.g., 4σ pixels. To compute the value for Disk[R, j], the defocus blur estimation module 110 sums the pixel values over each of the pixels of the j-th channel of an NFM frequency response image of the disc image of a disk of radius R. The defocus blur estimation module may perform this summation for each j and for each R to result in values for a 2D array.

In one or more implementations, the spatial frequency module 206 may compute the frequency responses to generate a frequency response image. In particular, the spatial frequency module may generate the frequency response image as an NFM-channel image. To do so, the spatial frequency module 206 may compute, for each pixel P of the image under consideration and for each spatial frequency F added to the frequency table 212, a frequency response of pixels in a Gaussian window centered on pixel P to the frequency F. The spatial frequency module 206 may compute this response by computing a filter kernel for each frequency F and the Gaussian window. Further, the spatial frequency module 206 may convolve the image under consideration with the filter to generate a local frequency complex response for the frequency F.

In conjunction with generating the frequency response image as an NFM-channel image, the spatial frequency module 206 may take various sums over the set of spatial frequencies in the frequency table 212. The spatial frequency module 206 may break these sums into a first sum over the possible values of the frequency magnitude and a second sum that sums the individual frequencies of a magnitude. To do so, the spatial frequency module 206 may compute sums according to the following:

$$\sum_{j=1}^{NFM} \sum_{i}^{FMSet[j]} Q(i)$$

Here, the term FMSet[j] represents a set of indices for the spatial frequencies in the j-th group of the frequency table 212, which are equal-magnitude spatial frequencies. When j equals '1' for instance, the term FMSet[j], represents a set of indices for which the spatial frequencies have a magnitude equal to the minimum frequency magnitude. When j equals '2', however, the term FMSet[j], represents the set of indices for which the spatial frequencies have a magnitude equal to a sum of the minimum frequency magnitude and the frequency magnitude increment. These sets of frequencies may correspond to the "frequency magnitude bins" discussed with reference to FIG. 4.

In other words, the frequency responses spatial frequencies in the NFM-channel image are sorted by magnitude of the corresponding spatial frequencies. The frequency responses computed with spatial frequencies having magnitudes that equal the minimum frequency magnitude may occupy a first channel in an array of the NFM-channel image. The frequency responses computed with spatial frequencies having magnitudes that equal a sum of the minimum frequency magnitude and the frequency magnitude increment may occupy a second channel of such an array. The frequency responses computed with spatial frequencies having magnitudes that equal a sum of the minimum frequency magnitude and two frequency magnitude increments may occupy a third channel position in such an array, and so forth. By computing frequency responses with the spatial frequencies for a given frequency magnitude fm, from a value equal to the minimum frequency magnitude $fm_0$, up to the maximum frequency magnitude $fm_1$, and in steps of the frequency magnitude increment df, as discussed above, the spatial frequency module 206 may generate the NFM-channel image in magnitude order.

As noted above, an NFM-channel image may have dimensions H×W×NFM, where H corresponds to the pixelwise height of the image under consideration, W corresponds to the pixelwise width of that image, and NFM corresponds number of distinct frequency magnitudes of the spatial frequencies selected. The NFM-channel image Y may thus correspond to a data structure having H×W×NFM places for storing data, e.g., floating point values. To compute the NFM-channel image Y, the spatial frequency module 206 may first initialize Y, such that each value is set to zero. Then the spatial frequency module 206 may populate the values of Y according to the following pseudo-code:

For each j=1 to NFM
        For each i in FMSet[j]
            For each pixel location P in image X $$Y(P,j)=Y(P,j)+Z[P,i]$$

In this pseudo-code, the plane number j in NFM-channel image Y is a sum of the corresponding planes of the image in frequency magnitude bin j, and image X is the original image, e.g., that for which the defocus blur is being estimated. Computing the NFM-channel image Y in this way, may be said to perform such computation on a "per set basis," such that each set includes the spatial frequencies having one of the distinct frequency magnitudes. In any case, the term Z[P,i] represents a floating point value in the i-th position at pixel P of the frequency response image 502, e.g., the squared response to the filter discussed above with reference to computation of the frequency response image 502.

Given the frequency response image (e.g., the NFM-channel image), blur disc radii module 208 may compute a probability that a given pixel P of an image under consideration (e.g., image X) was blurred by a disc of radius R. To do so, the blur disc radii module 208 may compute a variety of intermediate components, such as intermediate variable S and a logarithm of the probability, which enables computation of the probability that a given pixel P of an image is blurred by a blur disc radii having radius R.

In one or more implementations, the blur disc radii module 208 may compute S for each pixel of the image under consideration. At a given pixel, the blur disc radii module 208 may fix radius R to that of one of the selected blur disc radii 210. Given this, the blur disc radii module 208 may compute a maximum L(j) with reference to the NFM-channel image Y, for each j from 1 to NFM according to the following:

$$L(j) = \text{Max}\left(Y(P, j) - \frac{\text{Noise}[j]}{\text{Disk}[R, j]}, 1e^{-10}\right)$$

Here, the term Noise [j] represents the estimated background RMS noise and the term Disk[R,j] represents the summation of values in the NFM-channel image Y for a given frequency magnitude bin j as discussed previously. Having performed this computation, the blur disc radii module 208 may initialize the intermediate variable S according to the following:

$$S = \frac{\sum_{i=1}^{NFM} L(j)}{N}$$

Having initialized S, the blur disc radii module 208 may compute term p[j], for each index i from 1 to NFM, according to the following:

$$\rho[j] = \left(1 + \frac{\text{Noise}[j]}{S*\text{Disk}[R, j]}\right)^2$$

Once the blur disc radii module 208 computes the term p[j], it may then compute intermediate term nmlz, according to the following:

$$nmlz = \frac{1}{\sum_{i=1}^{NFM} n\text{Freq}[i]\rho(j)}$$

The term nFreq[i] represents a number of spatial frequencies in the frequency table 212 having the magnitude of the i-th group of equal-magnitude frequencies. The computation by the blur disc radii module 208 of S, p[j], and nmlz discussed above may be effective to initialize these terms. Once initialized, however, the blur disc radii module 208 may recompute S, p[j], and nmlz. The blur disc radii module 208 may, for instance, recompute S according to the following:

$$S = nmlz\sum_{i=1}^{N} \rho[j]L(j)$$

The blur disc radii module 208 recomputes S (and those other terms) in this way until S converges to approximately a same value. By way of example, the blur disc radii module 208 may recompute those terms three times. Once S is recomputed, the blur disc radii module 208 may recompute ρ[j] and nmlz in the manner discussed above. Using the intermediate variable S computed in this way, the blur disc radii module 208 may compute the logarithm of the probability. To do so, the blur disc radii module 208 may compute a logarithm of the probability for each pixel of an image under consideration. At a given pixel, the blur disc radii module 208 may fix radius R to that of one of the generated blur disc radii 210. The blur disc radii module 208 may then set the term log P to zero. The term log P may represent the log probability at pixel P that it was blurred by the disc with radius R. The actual probability though may correspond to Exp(log P). In any case, once log P is initialized the blur disc radii module 208 may compute the term v and recompute log P for each j from 1 through NFM. The blur disc radii module 208 may compute the term v according to the following:

$$v = \sum_{j=1}^{NFM} \frac{Y(P, j)}{S*\text{Disk}[R, j] + \text{Noise}[j]}$$

As noted above, the blur disc radii module 208 may recompute log P. The blur disc radii module 208 may do so according to the following:

$$\log P = \log P + \frac{1}{v} + nFreq[j]*\log(v)$$

Given S, log P, and a smoothing constraint, the blur disc radii module 208 may choose for each pixel in an image, the blur disc that most likely blurred the pixel. It should be noted that the smoothing constraint is used solely after the log P is computed for each pixel of the image under consideration. Nevertheless, choosing which of the blur disc radii most likely blurred each pixel of an image may be effective to estimate an amount of blur that is caused by lens defocus for each pixel of the image. As noted above, the amount of blur estimated for the original image 302 may be usable to generate the defocus blur map estimation 304. In one or more implementations, the defocus blur estimation module 110 may simply recover a mask of pixels that are less blurry than a threshold amount of blur.

Using the blur map or the mask, the defocus blur estimation module 110 may detect and segment an in-focus subject from an out of focus background of an image. By way of example, the segmented image 306 may be obtained through application of the defocus blur map estimation 304 to the original image 302. The segmented image 306 represents that in-focus subjects were segmented from the rest of the image. The blur map recovered based on the estimation of the defocus blur may also enable depth of objects in a captured scene to be estimated. From this, approximate three-dimensional information about the scene can be recovered from a single image.

Having discussed example details of the techniques for image defocus blur estimation, consider now some example procedures to illustrate additional aspects of the techniques.

Example Procedures

This section describes example procedures for image defocus blur estimation in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as example computing devices 102, 202 of FIGS. 1 and 2 that make use of a defocus blur estimation module 110.

FIG. 6 depicts an example procedure 600 in which spatial frequencies and blur disc radii that correspond to different amounts of defocus blur are computed to estimate an amount of blur caused by lens defocus at each pixel of an image. An image is identified for which an amount of blur due to lens defocus is to be estimated (block 602). For example, a user selects original image 302, such as via a photo editing application and to select in-focus objects from the original image 302.

Spatial frequencies that are useable to analyze the image for blur are selected (block 604). The spatial frequencies that are selected have frequency magnitudes from a set of discrete values that are spaced apart by a frequency magnitude increment between a minimum frequency magnitude and a maximum frequency magnitude. Further, at each frequency magnitude, one or more spatial frequencies are selected. By way of example, the spatial frequency module 206 selects spatial frequencies for defining a 2D frequency that may be used with a Gaussian window function for a Gabor filter as discussed above.

In particular, the spatial frequency module 206 selects spatial frequencies that are equally spaced on a polar grid. To limit the selected spatial frequencies to those equally spaced on the polar grid, the spatial frequency module 206 selects spatial frequencies that have magnitudes from a set of discrete values, e.g., a set of discrete magnitude values that range from a minimum frequency magnitude to a maximum frequency magnitude and are spaced apart by a frequency magnitude increment. When a spatial frequency is selected, the spatial frequency module 206 also adds data describing the spatial frequency to the frequency table 212. The data describing the selected spatial frequencies can be accessed from the frequency table 212 to determine a frequency response of pixels around a given pixel of an image to the selected frequencies.

Frequency responses are determined for the pixels of an image (block 606). The frequency responses determined indicate a response of pixels, around a given pixel of the image under consideration, to the frequencies selected at block 604.

For example, the spatial frequency module 206 may determine frequency responses for each of the pixels of the original image 302. The frequency response of the pixels around a given pixel may be determined using a Gabor filter, which is a product of the Gaussian window function and a complex sinusoid. To determine the frequency responses, the spatial frequency module 206 may access the selected spatial frequencies from the frequency table 212 to define the 2D frequency of the complex sinusoid. The determination of the frequency responses may result in an NFM-channel frequency response image. By limiting selection of spatial frequencies to those with magnitudes from a discrete set, the NFM-channel image may have significantly fewer channels than a frequency response image generated by conventional techniques that select spatial frequencies on a Cartesian grid.

Probabilities are computed that different blur disc radii blur the pixels of the image (block 608). To compute the probabilities, the frequency responses determined for the pixels are used. The blur disc radii for which the probabilities are computed, are those that cover the range of blurs to be analyzed in conjunction with the image under consideration. For example, the blur disc radii module 208 computes a likelihood for a given pixel of the original image 302 that it was blurred by each of the blur disc radii 210. To compute this likelihood, the blur disc radii module 208 may use the frequency responses determined at block 606, and may do so in the manner discussed above in detail. Further, the blur disc radii module 208 may repeat these computations for each pixel of the image.

Based on the probabilities, blur disc radii are chosen for the pixels of the image that most likely blurred the pixels (block 610). Further, an amount of blur caused by lens defocus at each pixel of the image can be estimated based on the chosen blur disc radii. For example, the blur disc radii module 208 may choose, for a given pixel of the original image 302, one of the blur disc radii 210 that most likely blurred that pixel. The blur disc radii module 208 makes this choice based in part on the probabilities computed at block 608. In addition to the probabilities, the blur disc radii module 208 also considers a smoothness constraint when choosing from the blur disc radii 210. The smoothness constraint may smooth the blur between the pixels that results from choosing blur disc radii based solely on the probabilities. However, this smoothness constraint may be relaxed where there are abrupt intensity changes in an image that correspond to object edges. In any case, the blur disc radii chosen by the blur disc radii module 208 may be effective to estimate an amount of blur caused by lens defocus at each pixel of the original image 302.

Based on the chosen blur disc radii, a blur map estimation is recovered (block 612). For example, once the blur disc radii module 208 chooses the blur disc radii for each pixel of the original image 302, the defocus blur map estimation 304 is recovered. To do so, the defocus blur estimation module 110 may compute the defocus blur map estimation 304 using the chosen blur disc radii and the original image 302. The defocus blur estimation module 110 may apply the chosen blur disc radii in several ways to the original image 302. By way of example, the defocus blur estimation module 110 may compute a 2D convolution of the filter kernel with the original image 302. The defocus blur estimation module 110 may also compute a Fourier Transform of the original image 302 and the chosen blur disc radii, multiply the two Fourier Transforms together pixel-by-pixel, and then apply an inverse Fourier Transform to that result to obtain the defocus blur map estimation 304.

Furthermore, the defocus blur map estimation 304 may be used to segment the original image 302 into in-focus subject and out-of-focus background, which is represented by segmented image 306. Additionally, the defocus blur map estimation may be used to estimate a depth of objects depicted in an image. To this extent, approximate 3D information of a scene may be recovered from just a single image. The estimated amount of blur may be used for a variety of applications in addition to image segmentation and object depth estimation without departing from the techniques described herein. Having described example procedures in accordance with one or more implementations, consider now an example system and device that can be utilized to implement the various techniques described herein.

Example System and Device

Figure 7:
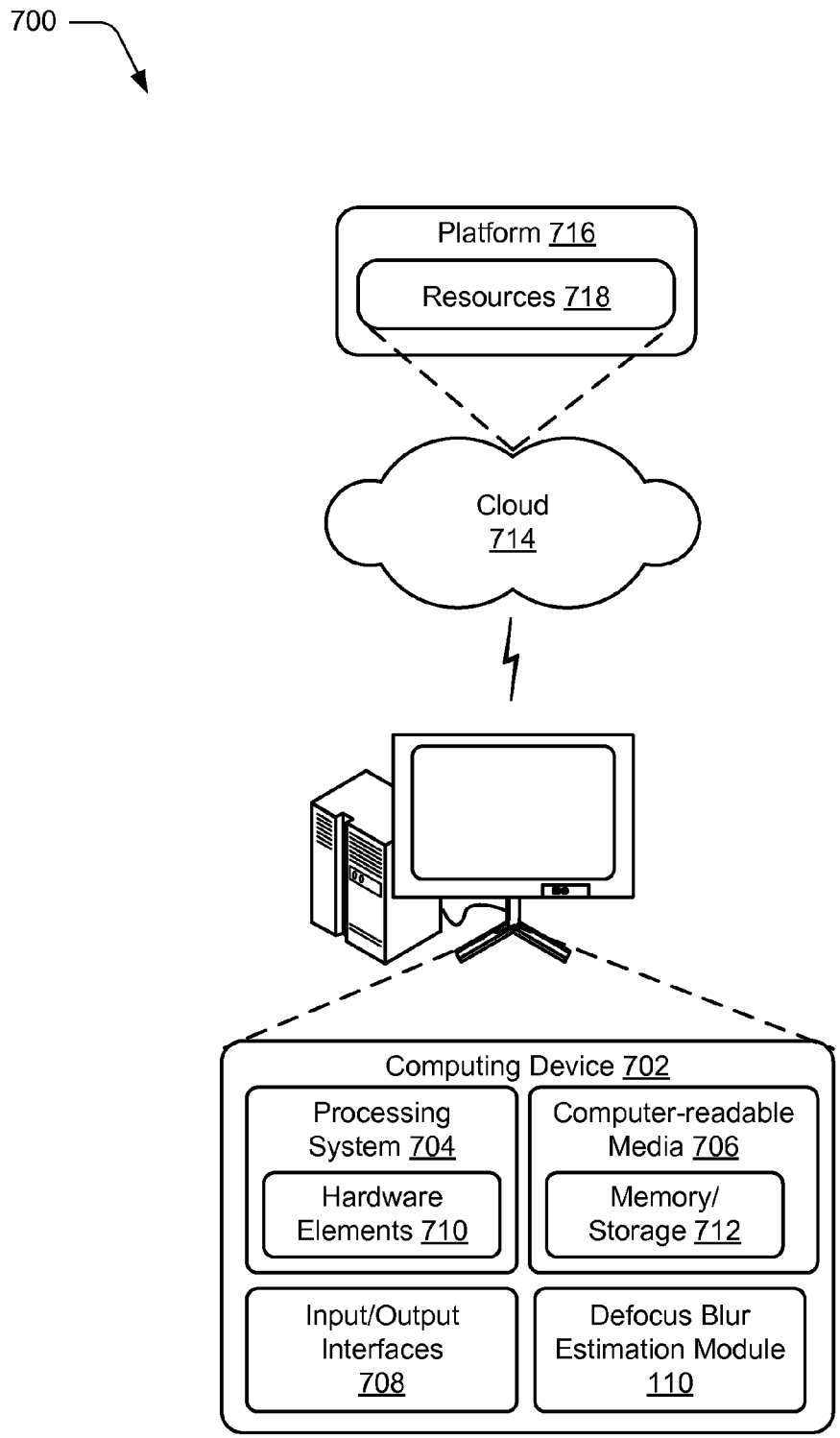
FIG. 7 illustrates an example system including various components of an example device that can be employed for one or more implementations of image defocus blur estimation techniques described herein.

FIG. 7 illustrates an example system generally at 700 that includes an example computing device 702 that is representative of one or more computing systems and/or devices that may implement the various techniques described herein. This is illustrated through inclusion of the defocus blur estimation module 110, which operates as described above. The computing device 702 may be, for example, a server of a service provider, a device associated with a client (e.g., a client device), an on-chip system, and/or any other suitable computing device or computing system.

The example computing device 702 includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its qualities set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method for implementing image processing operations that use an estimation of an amount of blur caused in images by lens defocus by one or more computing devices, the method comprising:
    determining, for one or more pixels of an image, frequency responses that indicate a response of the pixels around a given pixel to spatial frequencies that are useable to analyze an image for the blur, the frequency responses determined according to a function that takes a selected spatial frequency set as input, and the spatial frequencies in the set that are selected as the input having frequency magnitudes from a set of discrete values;
    computing, for the pixels and based on the frequency responses, probabilities that the pixel is blurred with blur disc radii that correspond to different amount of blur caused in an image by the lens defocus;
    choosing, for the pixels, the blur disc radii that is determined most likely to have blurred the pixel based in part on the probabilities, the choosing effective to estimate the amount of blur caused by lens defocus for the pixels of the image; and
    generating estimated blur amount date for the pixels according to the blur disc radii chosen, the estimated blur amount data being used to implement one or more of the image processing operations.

2. A method as described in claim 1, wherein the image processing operations include applying the chosen blur disc radii to the image to segment in-focus objects of the image from out-of-focus objects of the image.

3. A method as described in claim 1, wherein the image processing operations include applying the chosen blur disc radii to the image to estimate a depth of objects in the image.

4. A method as described in claim 1, wherein the spatial frequencies that are selected are equally spaced on a polar grid.

5. A method as described in claim 1, wherein the frequency responses are determined according to a filter kernel that is a product of a Gaussian window and a complex sinusoid, the spatial frequencies that are selected as the input defining a two-dimensional (2D) frequency of the complex sinusoid.

6. A method as described in claim 5, wherein a number of discrete values in the set of discrete values for the frequency magnitudes is based on a standard deviation of the Gaussian window.

7. A method as described in claim 1, further comprising constructing a frequency table comprising the spatial frequencies that are selected, the spatial frequencies being accessible from the frequency table for use as the input to the function.

8. A method as described in claim 7, wherein constructing the frequency table includes:
    initializing the frequency table so that the frequency table is empty;
    selecting a first spatial frequency to add to the frequency table, the first spatial frequency having a minimum frequency magnitude; and
    selecting additional spatial frequencies to add to the frequency table, such that:
        the additional spatial frequencies selected have frequency magnitudes that are a sum of the minimum frequency magnitude and an integer-multiple of a frequency magnitude increment;
        the integer-multiple increases by one in conjunction with a spatial frequency selection; and
        the additional frequencies are selected until the sum of the minimum frequency magnitude and the integer-multiple of the frequency magnitude increment is greater than a maximum frequency magnitude.

9. A method as described in claim 7, wherein constructing the frequency table includes selecting one or more spatial frequencies that have a given frequency magnitude to add to the frequency table, the one or more spatial frequencies being equally spaced apart at the given frequency magnitude by at least a frequency magnitude increment.

10. A method as described in claim 1, wherein choosing the blur disc radii that most likely blurred said pixel is further based on a smoothness constraint that affects a smoothness of the estimated amount of blur between the pixels.

11. A method as described in claim 10, wherein the smoothness constraint is relaxed for intensity changes in the image that correspond to edges of objects in the image.

12. A method as described in claim 1, further comprising computing a frequency response image which has a number of channels corresponding to a number of distinct frequency magnitudes of the spatial frequencies selected, including computing values for the channels of the frequency response image on a per frequency magnitude bin basis, each frequency magnitude bin comprising the spatial frequencies having one of the distinct frequency magnitudes.

13. A system comprising:
one or more processors; and
a memory storing computer-readable instructions that are executable by the one or more processors to perform operations comprising:
  maintaining a frequency table that includes spatial frequency data that describes different spatial frequencies that are equally spaced on a polar grid;
  determining frequency responses of pixels around a given pixel in an image to the different spatial frequencies, the frequency responses determined according to a function that takes the spatial frequency data describing the different spatial frequencies as input;
  choosing blur disc radii that correspond to different amounts of defocus blur for the pixels of the image to estimate an amount of blur caused by lens defocus for the pixels, the blur disc radii that is determined most likely to have blurred each said pixel chosen based in part on the frequency responses; and
  generating estimated blur amount data for the pixels according to the blur disc radii chosen, the estimated blur amount data being used to implement one or more image processing operations.

14. A system as described in claim 11, wherein the blur disc radii that most likely blurred each said pixel further being chosen based on estimated noise of the image.

15. A system as described in claim 11, wherein the operations further comprise determining the frequency responses of pixels around the given pixel in the image to spatial frequencies described by additional spatial frequency data, the additional spatial frequency data maintained as part of another frequency table and describing spatial frequencies that are equally spaced on a Cartesian grid.

16. A system as described in claim 11, wherein estimating an amount of blur caused by lens defocus for the pixels further includes computing, for each of the pixels, probabilities that said pixel is blurred with each of the blur disc radii, the blur disc radii being chosen based in part on the probabilities.

17. A method for implementing image processing operations that use an estimation of an amount of blur caused in images by lens defocus by a computing device, the method comprising:
  selecting spatial frequencies that have frequency magnitudes from a set of discrete values that are spaced apart by a frequency magnitude increment between a minimum frequency magnitude and a maximum frequency magnitude;
  constructing a frequency table to maintain data describing the selected spatial frequencies, and which is accessed from the frequency table to determine frequency responses that indicate a response of pixels around a given pixel in an image to the selected spatial frequencies, the frequency responses being used to choose blur disc radii that correspond to different amounts of blur caused in an image by lens defocus; and
  generating estimated blur amount data for an image that is representative of the chosen blur disc radii, the estimated blur amount data being used to implement one or more of the image processing operations.

18. A method as described in claim 17, further comprising determining the frequency responses using the data describing the selected spatial frequencies from the frequency table, the frequency responses determined according to a filter kernel that is a product of a Gaussian window function with a complex sinusoid, and the data describing the selected spatial frequencies defining a 2D frequency of the complex sinusoid.

19. A method as described in claim 17, wherein the spatial frequencies that are selected are equally spaced on a polar grid.

20. A method as described in claim 17, further comprising choosing one of the blur disc radii that most likely blurred each of the pixels of the image to estimate an amount of blur caused by lens defocus at each said pixel.

* * * * *

UNITED STATES PATENT AND TRADEMARK OFFICE
CERTIFICATE OF CORRECTION

PATENT NO. : 9,357,123 B1  
APPLICATION NO. : 14/581688  
DATED : May 31, 2016  
INVENTOR(S) : Stephen N. Schiller It is certified that error appears in the above-identified patent and that said Letters Patent is hereby corrected as shown below:

In the claims,

Column 22, line 23, after "blur amount" delete "date", insert -- data --, therefor.

Column 24, line 14, after "that use" delete "an", therefor.

Signed and Sealed this  
Ninth Day of August, 2016

Michelle K. Lee  
*Director of the United States Patent and Trademark Office*